(12) United States Patent
Sekine

(10) Patent No.: US 6,577,033 B1
(45) Date of Patent: Jun. 10, 2003

(54) STATOR

(75) Inventor: Katsumi Sekine, Nihonmatsu (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 09/466,854

(22) Filed: Dec. 20, 1999

(30) Foreign Application Priority Data

Dec. 18, 1998 (JP) .......................................... 10-360233

(51) Int. Cl.$^7$ .......................... F16D 41/12; F16D 13/74; H02K 1/10
(52) U.S. Cl. ............................. 310/78; 310/92; 192/46; 415/123
(58) Field of Search ................................ 310/254, 258, 310/75 R, 76, 78, 91, 92, 100; 192/40, 41 R, 46, 108; 415/123, 200

(56) References Cited

U.S. PATENT DOCUMENTS

| | | | | |
|---|---|---|---|---|
| 1,956,417 A | * | 4/1934 | Else ............................ | 310/78 |
| 2,586,259 A | * | 2/1952 | Reid ........................... | 310/78 |
| 4,510,405 A | * | 4/1985 | Carroll et al. ................ | 310/78 |
| 5,449,057 A | | 9/1995 | Frank ........................... | 192/46 |
| 5,655,875 A | * | 8/1997 | Sekine ......................... | 415/123 |
| 5,855,263 A | * | 1/1999 | Fergle ......................... | 192/46 |
| 6,059,088 A | * | 5/2000 | Sekine et al. ............ | 192/107 T |

FOREIGN PATENT DOCUMENTS

| | | |
|---|---|---|
| EP | 0525126 | 9/1996 |
| JP | 5-506707 | 9/1993 |
| WO | WO91/16553 | 10/1991 |

* cited by examiner

*Primary Examiner*—Nestor Ramirez
*Assistant Examiner*—Dang Dinh Le

(57) ABSTRACT

A stator has a pocket portion (8) of a notch type resin-made stator, in which strength of an outer corner R (12b) provided in the pocket portion (8) is increased to thereby prevent the resin-made stator body (1) from being broken from the outer corner R (12b). A stator has a pocket portion (8) encasing a strut 9 of a notch type one-way clutch (5). The pocket portion (8) is provided in a stator body (1) made of resin, and corner Rs (12a, 12b) are provided on both inner and outer sides of a strut engaging surface (13) in the pocket portion (8). The outer corner R (12b) is formed to be larger than the inner corner R (12a).

26 Claims, 16 Drawing Sheets

STATOR

TECHNICAL FIELD

The present invention relates to a stator for use in a torque converter of an automatic transmission for automobiles and others.

RELATED ART

Conventionally, a stator has been known, which has an annular stator body 1 having an inner annulus 2, a vane 3 and an outer annulus 4 concentrically integrally molded of a resin material such as a phenol resin, and in which a notch type one-way clutch 5 is provided on the inner peripheral side of the stator body 1, as shown in FIGS. 19 and 20.

In the conventional stator as described, the notch type one-way clutch 5 is constituted as follows:

That is, first, a pocket plate 6 made of metal in the form of annulus is secured by insert molding to the inner peripheral side of the stator body 1, and a notch plate 7 made of metal likewise in the form of annulus is combined with the pocket plate 6 relatively rotatably. As shown in section of FIG. 21, the fixed number of pocket portions 8 are equally arranged on an end portion 6a of the pocket plate 6, and struts 9 are supported by means of a spring 10 on the pocket portions 8 and encased therein for oscillation. The fixed number of engaging recesses 11 are equally arranged in an end portion 7a of the notch plate 7 opposite to the end portion 6a of the pocket plate 6, and one inner wall 11a in the peripheral direction of the engaging recess 11 is formed at a relatively acute rising angle so that the strut 9a comes in engagement (locking) with the inner wall 11a. On the other hand, the other inner wall 11b in the peripheral direction of the engaging recess 11 is formed at relatively gentle rising angle so that the strut 9 gets over (idle running) the inner wall 11b. Accordingly, by the provision of the engaging construction of the engaging recess 11 with the strut 9, when the notch plate 7 is intended to relatively rotate in the direction of A in the figure with respect to the pocket plate 6, the strut 9 comes in engagement with one inner wall 11a of the engaging recess 11 to prevent from relative rotation, allowing only the relative rotation in the opposite direction B.

In the stator provided with the one-way clutch 5 as described above, recently, there is a tendency that materials for components are changed from metal to resin from a viewpoint of lightening of parts and facilitation thereof, and as a part therefore, the stator having the pocket plate 6 formed of resin has been developed.

As shown in FIGS. 22 to 25, when the pocket plate 6 is formed of resin, the pocket plate 6 is also molded integral with the stator body 1 likewise made of resin, and the pocket portion 8 is also formed of resin. Accordingly, corner Rs 12a and 12b are provided on the pocket portion 8 in order to increase the strength of the pocket portion 8. The Rs 12a and 12b are formed in an inner corner portion of the pocket portion 8 with roundness of quarter circle or circular arc in section to disperse stress generated in the inner corner portion to thereby reinforce the inner corner portion, the roundness being formed in inner corner portions on both inner and outer sides (inside and outside) of a strut engaging surface 13 for supporting the strut 9 out of four inner corner portions of the pocket portion 8.

However, in the stator as shown in FIGS. 22 to 25, both the inner corner R 12a and the outer corner R 12b provided in the pocket portion 8 are formed to have the same size (radius dimension or radius of curvature), and the pocket portion 8 which opens substantially in the shape of rectangle with respect to the end portion 6a of the pocket plate 6 is formed with its longitudinal direction directed at a tangential direction of the stator body 1, thus sometimes posing an inconvenience as noted below.

That is, the stator in FIGS. 22 to 25 is fabricated, and the FEM analysis is made as follows: As a result of analysis, the outer corner R 12b is a stress concentrated portion, and stress generated in the outer corner R 12b is considerably larger than that generated in the inner corner R 12a. Accordingly, the strength of the outer corner R 12b is short, and the stator body 1 is possibly broken from the outer corner R 12b.

SUMMARY OF THE INVENTION

It is an object of the present invention to provide a stator in which strength of an outer corner R provided in a pocket portion of a notch type resin-made stator is increased to thereby prevent the resin-made stator body from being broken from the outer corner R.

According to claim 1 of the present invention, there is provided a stator in which a pocket portion encasing a strut of a notch type one-way clutch is provided in a stator body made of resin, and corner Rs are provided on both inner and outer sides of a strut engaging surface in said pocket portion, the outer corner R being formed to be larger than the inner corner R.

According to claim 2 of the present invention, there is provided a stator in which a pocket portion encasing a strut of a notch type one-way clutch is provided in a stator body made of resin, and corner Rs are provided on both inner and outer sides of a strut engaging surface in said pocket portion, said pocket portion being formed to be inclined at a fixed angle in a tangential direction so that stress generated in the inner corner R is equal to or substantially equal to that generated in the outer corner R.

Further, according to claim 3 of the present invention, there is provided a stator in which a pocket portion encasing a strut of a notch type one-way clutch is provided in a stator body made of resin, and corner Rs are provided on both inner and outer sides of a strut engaging surface in said pocket portion, said strut engaging surface being arranged on a plane including a center axis of said stator body.

Furthermore, according to claim 4 of the present invention, there is provided the stator of claim 3, wherein width of the strut engaging surface is formed to be larger than that of other parts of the pocket portion, and corner Rs are provided in both inner and outer sides of said wide strut engaging surface.

In the corner Rs provided in the pocket portion of the notch type resin-made stator, when the outer corner R is formed to be larger than the inner corner R, stress generated in the outer corner R is widely diffused to thereby enable increasing strength of the outer corner R.

Further, when the pocket portion is inclined at a fixed angle in a tangential direction so that stress generated in the inner corner R is equal to that generated in the outer corner R, stresses generated in the inner corner R and the outer corner R are properly balanced so that the stress generated in the outer corner R is small to thereby enable increasing strength of the outer corner R.

Further, when the strut engaging surface is arranged on the plane including the center axis of the stator body, the stress generated in the inner corner R is likewise equal to or substantially equal to that generated in the outer corner R. Accordingly, stresses generated in the inner corner R and the outer corner R are properly balanced so that the stress generated in the outer corner R is small to thereby enable increasing strength of the outer corner R.

Further, when width of the strut engaging surface is formed to be larger than that of other parts of the pocket portion, and corner Rs are provided in both inner and outer sides of said wide strut engaging surface, the respective corner Rs are enlarged. Accordingly, stress generated in the outer corner R is widely diffused.

The present invention takes effects as follows:

According to the stator of claim 1, in the corner Rs provided in the pocket portion of the notch type resin-made stator, the outer corner R is formed to be larger than the inner corner R. Therefore, stress is widely diffused in the outer corner R to thereby enable increasing strength of the outer corner R. Accordingly, strength of the outer corner R is increased to enable preventing the outer corner R from occurrence of inconveniences such as cracks and to prevent the resin-made stator body from being broken from the outer corner R.

According to the stator of claim 2, the pocket portion is inclined at a fixed angle in a tangential direction so that stress generated in the inner corner R is equal to or substantially equal to that generated in the outer corner R. Therefore, stresses generated in the inner corner R and the outer corner R are properly balanced, and stress generated in the outer corner R is small, to thereby enable increasing strength of the outer corner R. Accordingly, strength of the outer corner R is increased to enable preventing the outer corner R from occurrence of inconveniences such as cracks and to prevent the resin-made stator body from being broken from the outer corner R.

According to the stator of claim 3, since the strut engaging surface is arranged on the plane including the center axis of the stator body, stress generated in the inner corner R is equal to or substantially equal to that generated in the outer corner R. Therefore, stresses generated in the inner corner R and the outer corner R are properly balanced, and stress generated in the outer corner R is small, to thereby enable increasing strength of the outer corner R. Accordingly, strength of the outer corner R is increased to enable preventing the outer corner R from occurrence of inconveniences such as cracks and to prevent the resin-made stator body from being broken from the outer corner R.

In addition, according to the stator of claim 4, width of the strut engaging surface is formed to be larger than that of other parts of the pocket portion, and corner Rs are provided in both inner and outer sides of said wide strut engaging surface. Therefore, the corner Rs are enlarged, and stress is widely diffused also in the outer corner R. Accordingly, strength of the outer corner R is increased to enable preventing the outer corner R from occurrence of inconveniences such as cracks and to prevent the resin-made stator body from being broken from the outer corner R.

DESCRIPTION OF THE EMBODIMENTS

The embodiments of the present invention will be described hereinafter with reference to the drawings.

Embodiment 1

Figure 1:
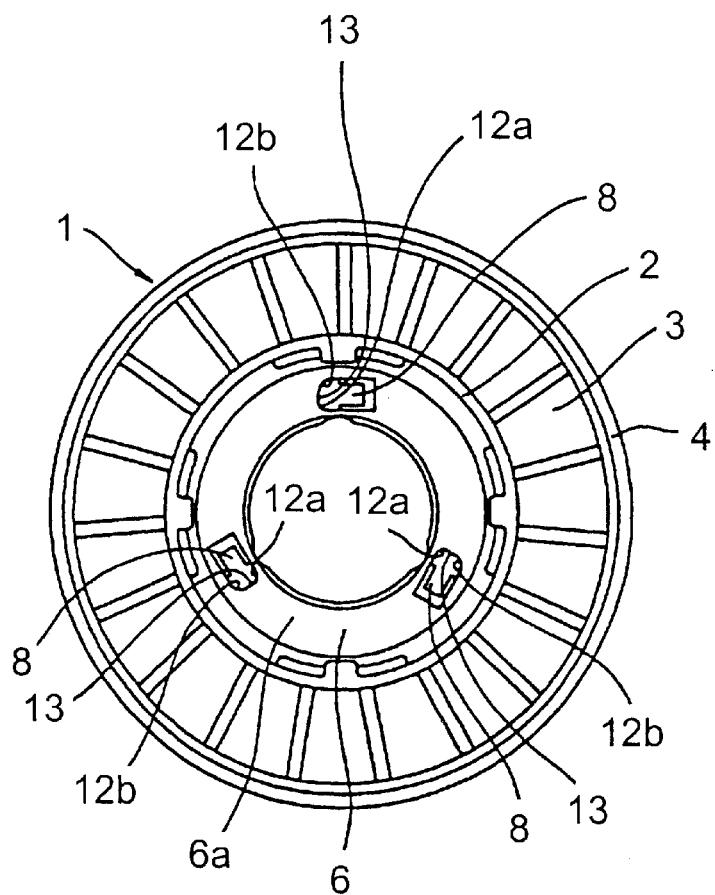
FIG. 1 is a front view of a stator body provided on a stator according to a first embodiment of the present invention.

As shown in FIG. 1, a stator according to Embodiment 1 is provided with a stator body 1 made of resin such as phenol resin in the form of an annulus, the stator body 1 being integrally provided with an inner annulus (called also a shell or a stator shell) 2, a vane (called also a blade) 3 and an outer annulus (called also a core or a stator core) 4, the inner annulus 2 being integrally molded on the inner peripheral side with a pocket plate 6 made of resin likewise in the form of an annulus, the pocket plate 6 being provided in an end portion 6a with the fixed number of pocket portions 8 equally spaced (three in the figure).

Figure 24:
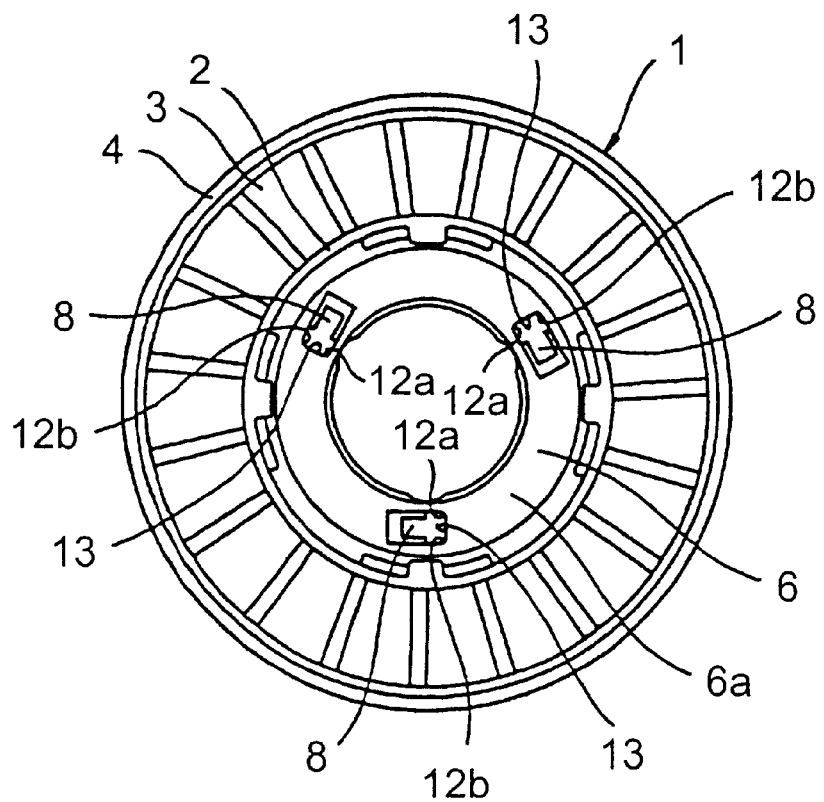
FIG. 24 is a back view of the stator body.
Figure 25:
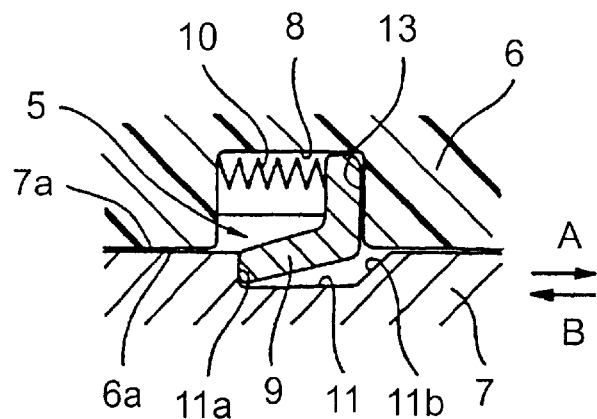
FIG. 25 is an enlarged sectional view of main parts showing an assembled state of the stator.

Note that FIG. 1 depicts only the stator body 1 as an integral molded article made of resin comprising the inner annulus 2, the vane 3, the outer annulus 4 and the pocket plate 6. Separately from this stator body 1, the notch plate 7, the strut 9, the spring 10 and so on are installed to constitute the notch type one-way clutch 5, as shown in FIG. 24. The notch plate 7 is molded of metal in the shape of annulus, and is combined with the stator body 1 integral with the pocket plate 6 for relative rotation. The notch plate 7 is provided with an engaging recess 11 with which the strut 9 is engaged in one rotational direction. The strut 9 is supported on the spring 10 and received in the pocket portion 8 for oscillation.

The pocket portion 8 is opened substantially in the rectangular shape with respect to the end portion 6a of the pocket plate 6, and the longitudinal direction thereof is directed at the tangential direction of the stator body 1 or in the direction parallel to the tangential line. The surface on one end side in the longitudinal direction out of the inner surfaces of the pocket portion 8 constitutes the strut engaging surface (called also the strut support surface) 13 which supports the strut 9, the strut engaging surface 13 being the surface at right angle to the end portion 6a of the pocket plate 6.

Figure 2:
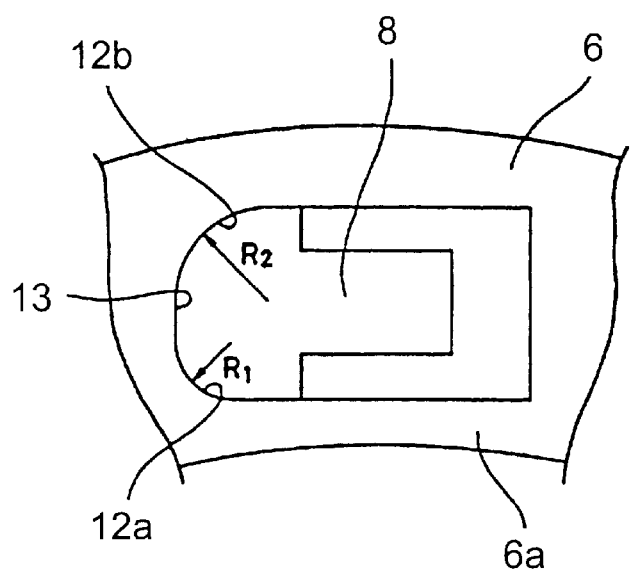
FIG. 2 is an enlarged view of main parts of FIG. 1.

Inner corner portions on both inner and outer sides of the strut engaging surface 13 are provided with corner Rs 12a, 12b having a shape of a quarter circle or circular arc in section, but as shown in FIG. 2 in an enlarged scale, the outer (outer circular arc in section, but as shown in FIG. 2 in an enlarged scale, the outer (outer peripheral) corner R 12b out of both the inner and outer corner Rs 12a, 12b is formed to be larger in inside diameter dimension or radius of curvature than the inner (inner peripheral) corner R 12a (R1<R2, 1<$R_2/R_1$≦3) whereby strength of the outer corner R 12b is increased. Both the corner R 12a, 12b are respectively determined in size so that stresses generated are equal to or substantially equal to each other, and both of them are formed so as to have strength to a degree that not generate an inconvenience such as cracks caused by stress generated.

Accordingly, according to the resin stator as described above, the strength of the outer corner R 12b can be increased to prevent the inconvenience such as cracks from occurring in the outer corner R 12b, and to prevent the resin-made stator body 1 from being broken from the outer corner R 12b.

Embodiment 2

Figure 3:
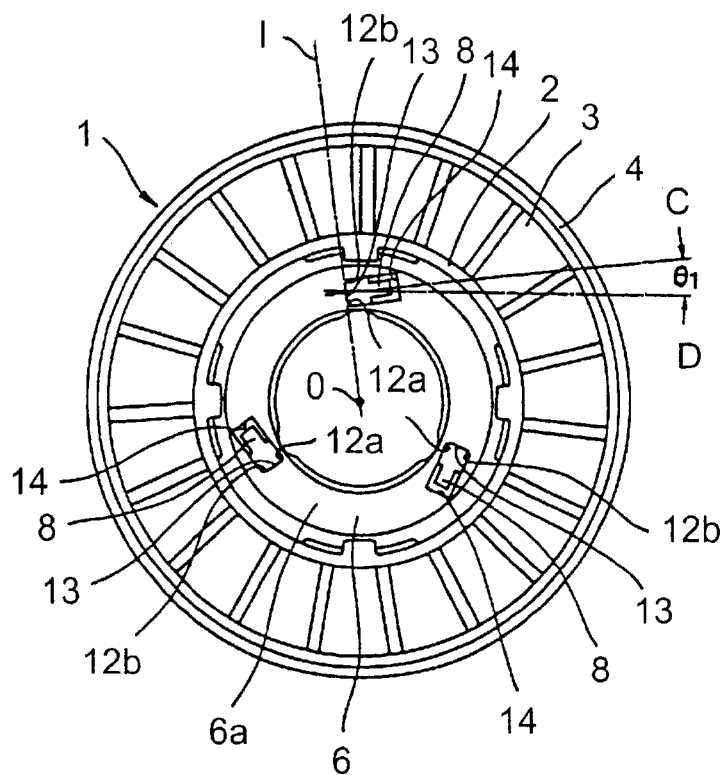
FIG. 3 is a front view of a stator body provided on a stator according to a second embodiment of the present invention.

As shown in FIG. 3, a stator according to Embodiment 2 is provided with a stator body 1 made of resin such as phenol resin in the form of an annulus, the stator body 1 being integrally provided with an inner annulus (called also a shell or a stator shell) 2, a vane (called also a blade) 3 and an outer annulus (called also a core or a stator core) 4, the inner annulus 2 being integrally molded on the inner peripheral side with a pocket plate 6 made of resin likewise in the form of an annulus, the pocket plate 6 being provided in an end portion 6a with the fixed Note that FIG. 3 depicts only the stator body 1 as an integral molded article made of resin comprising the inner annulus 2, the vane 3, the outer annulus 4 and the pocket plate 6. Separately from this stator body 1, the notch plate 7, the strut 9, the spring 10 and so on are installed to constitute the notch type one-way clutch 5, as shown in FIG. 24. The notch plate 7 is molded of metal in the shape of annulus, and is combined with the stator body 1 integral with the pocket plate 6 for relative rotation. The notch plate 7 is provided with an engaging recess 11 with which the strut 9 is engaged in one rotational direction. The strut 9 is supported on the spring 10 and received in the pocket portion 8 for oscillation.

The pocket portion 8 is opened substantially in the rectangular shape with respect to the end portion 6a of the pocket plate 6, and the longitudinal direction (direction C in the figure) thereof is provided to be inclined at a fixed angle of $\theta_1$ with respect to the tangential direction of the stator body 1 or in the direction parallel to the tangential line (direction D in the figure). The surface on one end side in the longitudinal direction out of the inner surfaces of the pocket portion 8 constitutes the strut engaging surface (called also the strut support surface) 13 which supports the strut 9, the strut engaging surface 13 being the surface at right angle to the end portion 6a of the pocket plate 6.

Inner corner portions on both inner and outer sides of the strut engaging surface 13 are provided with corner Rs 12a, 12b having a shape of a quarter circle or circular arc in section, and in the corner Rs 12a, 12b, both the inner (inner peripheral) corner R 12a and the outer (outer peripheral) corner R 12b are formed to have the same size (radius dimension or radius of curvature).

The corner Rs 12a, 12b are provided in inner corner surfaces of the surface on one end side in the longitudinal direction provided with the strut engaging surface 13 in the inner surface of the pocket portion 8 as described above. However, the pocket portion 8 is inclined with respect to the tangential direction of the stator body 1 or the direction D parallel to the tangential line so that the inner surface (the end) provided with the corner Rs 12a, 12b and the strut engaging surface 13 is positioned inwardly in the diametral direction whereas the inner surface (the end) 14 not provided with the corner Rs 12a, 12b and the strut engaging surface 13 on the opposite side is positioned outwardly in the diametral direction. This results from the fact that stress generated in the inner corner R 12a and stress generated in the outer corner R 12b are set to be equal to each other. The numerical value of the angle of inclination $\theta_1$ is set from a viewpoint as described, and the strut engaging surface 13 is arranged on the plane I including the center axis O of the stator body 1, as will be explained in Embodiment 3 later.

In the resin stator provided with the aforementioned constitution, the pocket portion 8 is formed to be inclined at a fixed angle $\theta_1$ with respect to the tangential direction or in the direction D parallel to the tangential line so that stress generated in the inner corner R 12a and stress generated in the outer corner R 12b are equal to each other. Therefore, the stress can be properly diffused in the inner corner R 12a and the outer corner R 12b whereby stress generated in the outer corner R 12b can be reduced substantially. Accordingly, the strength of the outer corner R 12b can be increased, thus preventing the inconvenience such as cracks from occurring in the outer corner R 12b, and to prevent the resin-made stator body 1 from being broken from the outer corner R 12b.

Embodiment 3

Figure 4:
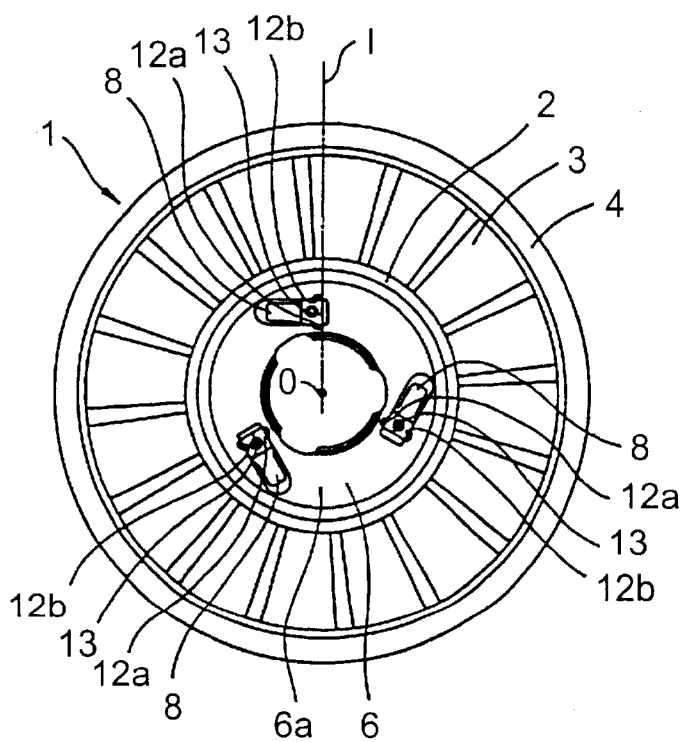
FIG. 4 is a front view of a stator body provided on a stator according to a third embodiment of the present invention.
Figure 5A:
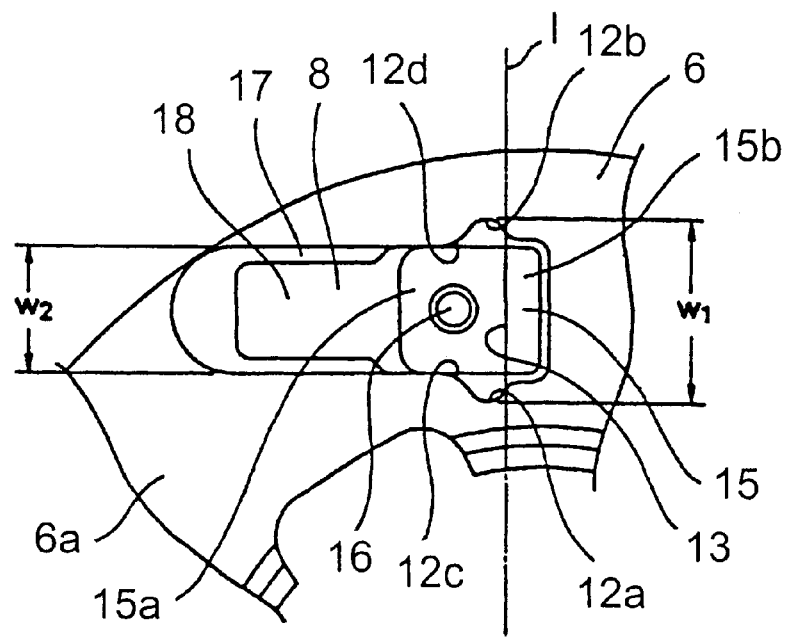
FIG. 5(A) is an enlarged view of main parts of FIG. 4, and FIG. 5(B) being a sectional view thereof.
Figure 5B:
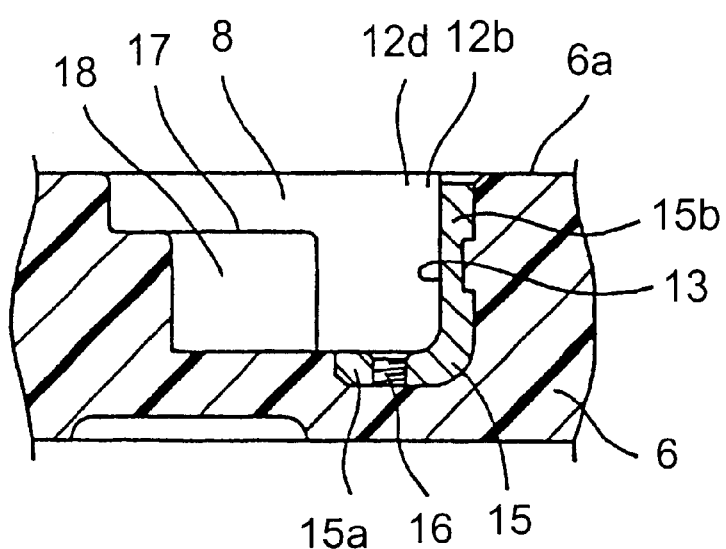

As shown in FIGS. 4 and 5, a stator according to Embodiment 3 is provided with a stator body 1 made of resin such as phenol resin in the form of an annulus, the stator body 1 being integrally provided with an inner annulus (called also a shell or a stator shell) 2, a vane (called also a blade) 3 and an outer annulus (called also a core or a stator core) 4, the inner annulus 2 being integrally molded on the inner peripheral side with a pocket plate 6 made of resin likewise in the form of an annulus, the pocket plate 6 being provided in an end portion 6a with the fixed number of pocket portions 8 equally spaced (three in the figure).

Figure 6:
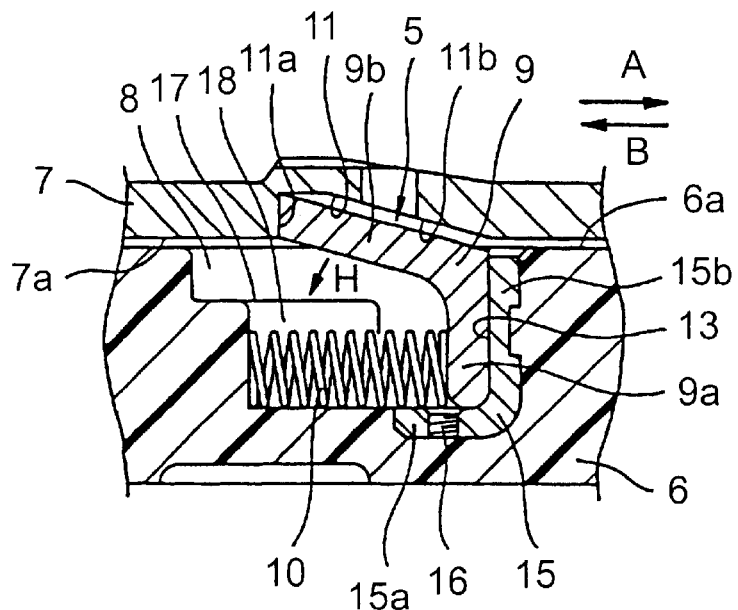
FIG. 6 is an enlarged sectional view of main parts showing an assembled state of the stator.

Note that FIGS. 4 and 5 depict only the stator body 1 as an integral molded article made of resin comprising the inner annulus 2, the vane 3, the outer annulus 4 and the pocket plate 6. Separately from this stator body 1, the notch plate 7, the strut 9, the spring 10 and so on are installed to constitute the notch type one-way strut 9, the spring 10 and so on are installed to constitute the notch type one-way clutch 5, as shown in FIG. 6. The notch plate 7 is molded of metal in the shape of annulus, and is combined with the stator body 1 integral with the pocket plate 6 for relative rotation. The notch plate 7 is provided with an engaging recess 11 with which the strut 9 is engaged in one rotational direction. The strut 9 is supported on the spring 10 and received in the pocket portion 8 for oscillation in the direction H as shown. These configurations will be described later.

The pocket portion 8 is opened to the end portion 6a of the pocket plate 6, and reinforcing fittings 15 is secured interiorly thereof by a screw-like stop 16 or insert molding and so on. The opening shape of the pocket portion 8 is in the longitudinal direction, one end of which is framed in rectangular shape, and the other end framed in semi-circle or circular arc. The reinforcing metal fittings 15 is installed on the rectangular end side, and the end of the reinforcing fittings 15 comprises the strut engaging surface (called also a strut support surface) 13 for supporting the strut. The strut engaging surface 13 constitutes the surface at right angles to the end portion 6a of the pocket plate 6 and is arranged on the plane I including the center axis O of the stator body 1.

In the strut engaging surface 13, its width $W_1$ is set to be larger than width $W_2$ of other portions of the pocket portion 8 ($W_1 > W_2$, $1 < W_1/W_2 \leq 2$), and the inner corner portions on both inner and outer sides of the wide strut engaging 12b are formed to have a substantially semi-circle or a circular art in section on the basis of the difference of width, and inverted-R or convex circular arc portions 12c, 12d are provided between the portion having a substantially semi-circle or circular arc in section and the side portion of the pocket portion 8. The inner (inner peripheral) Rs 12b, 12c and the outer (outer peripheral) corner Rs 12a, 12d are the same in size (radius dimension or radius of curvature) as each other, and are formed symmetrically.

The pocket portion 8 is interiorly integrally molded with a dam-like or inner shelf-like stopper portion 17 for limiting oscillation of the strut 9 to a fixed angle, and a groove-like spring mounting portion 18 is provided so as to cut a part of the stopper portion 17. The reinforcing fittings 15 is designed such that one end of a planar bottom portion 15a is integrally molded with a similar planar rising portion 15b, which has a substantially L-shape in section, the upper surface of the former bottom portion 15a constituting a part of the bottom of the pocket portion 8, and the inner side of the latter rising portion 15b constituting the strut engaging surface 13.

As shown in FIG. 6, the strut 9 received in the pocket portion 8 is that a planar engaging portion 9b is molded integral with one end of a planar base portion 9a, and is formed of metal. Further, the latter engaging portion 9b is integrally molded obliquely upward with respect to the former base portion 9a. The spring 10 is coil spring, which is interposed between the end portion of a spring mounting portion 18 and the base portion 9a of the strut 9 in an adequately compressed state and in a horizontal direction in the figure. Accordingly, the strut 9 is oscillated about the lower end of the base portion 9a in the direction H against the elasticity of the spring 10, and is returned to the illustrated attitude by the elasticity of the spring 10.

An engaging recess 11 is provided in the end portion 7a of the notch plate 7, and one inner wall 11a in a peripheral direction of the engaging recess 11 is molded at a relatively acute rising angle so that the engaging portion 9b of the strut 9 engages therewith. On the other hand, the other inner wall 11b in a peripheral direction of the engaging recess 11 is molded at a relatively gentle rising angle so that the engaging portion 9b of the strut 9 gets over the former. Accordingly, by the engaging construction between the strut 9 and the engaging recess 11, when the notch plate 7 is intended to be rotated in the direction A relative to the pocket plate 6, the strut 9 engages with one inner wall 11a of the engaging recess 11 to obstruct the relative rotation and allow only the relative rotation in the opposite direction B.

Figure 7:
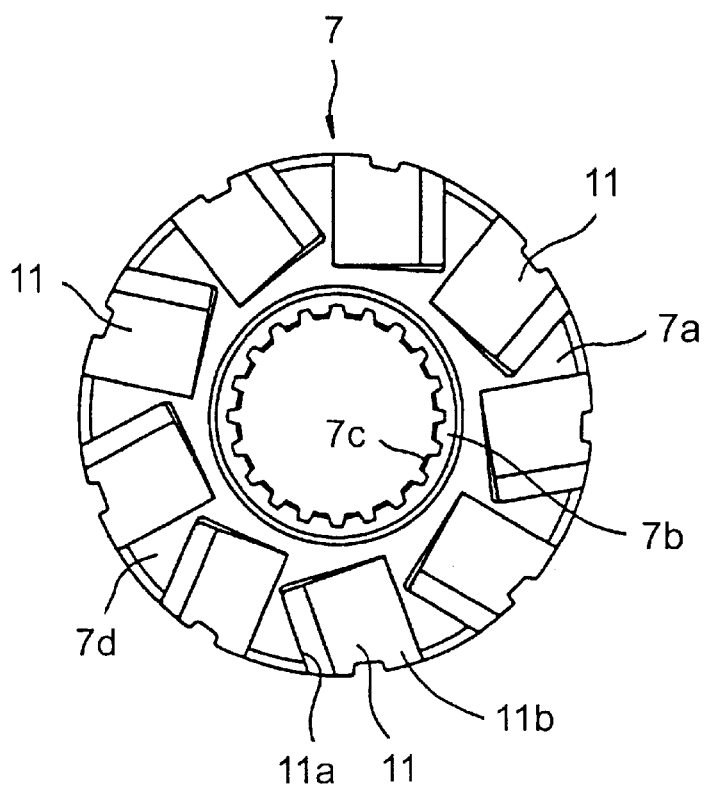
FIG. 7 is a front view of a notch plate.
Figure 8:
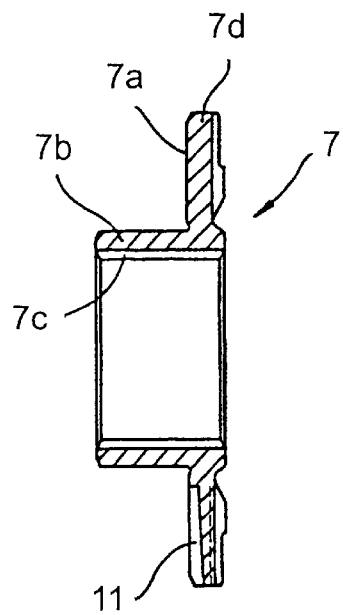
FIG. 8 is a sectional view of the notch plate.
Figure 9:
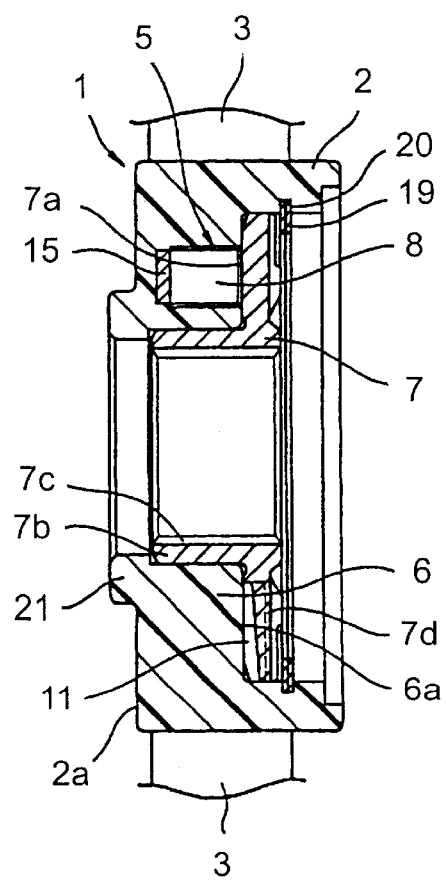
FIG. 9 is a sectional view of main parts showing an assembled state of the stator.

The notch plate 7 is constituted, as shown in FIGS. 7 and 8, and is installed for rotation relative to the stator body 1 as shown in FIG. 9.

That is, as shown in FIGS. 7 and 8, the notch plate 7 is first provided with a cylindrical base portion 7b, a spline 7c for transmitting torque is provided in the inner peripheral surface of the base portion 7b, and a planar rising portion 7d is molded integral with the base portion 7b. The rising portion 7d is annular and flange-like, the inner surface of the flange-like rising portion 7d constitutes the end portion 7a opposite to the end portion 6a of the pocket plate 6, and the required number of engaging recesses 11 are equally provided in the end portion 7a. The number is 9 in the figure, which is three times of three of the pocket portion 8. As shown in FIG. 9, the notch plate 7 is installed for rotation relative to the stator body 1 by inserting the cylindrical base portion 7b into the inner peripheral side of the pocket plate 6 molded integral with the stator body 1 from one axial direction, and is prevented from slipping out in the axial direction relative to the stator body 1 by a snap ring 19. The snap ring 19 is mounted in an annular mounting groove (called also snap ring groove) 20 formed in the inner peripheral surface of an inner tube 2 molded integral with the stator body 1.

In the resin stator provided with the above-described constitution, first, since the strut engaging surface 13 is arranged on the plane I including the center axis O of the stator body 1, stress generated in the inner corner R 12a and stress generated in the outer corner R 12b, which are provided on both inner and outer sides of the strut engaging surface 13, are substantially equal to each other. In addition, width $W_1$ of the strut engaging surface 13 is set to be larger than width $W_2$ of the other portion of the pocket portion 8, and the relatively large corner Rs 12a, 12b are provided on both inner and outer sides of the strut engaging surface 13, thus dispersing stresses generated in the corner Rs 12a, 12b. Accordingly, from the foregoing, the stress generate in the outer corner R 12b is substantially reduced and the strength of the outer corner R 12b can be increased, thus preventing the inconvenience such as cracks from occurring in the outer corner R 12b, and to prevent the resin-made stator body 1 from being broken from the outer corner R 12b.

Further, as described above, the number (9 in the figure) of the engaging recess 11 of the notch plate 7 is set to be more than the number (3 in the figure) of the pocket portion 8 and the strut 9, specifically, double. Therefore, stress generated in one inner wall 11a of the engaging recess 11 (called also a notch engaging surface) and stress generated in the strut engaging surface 13 can be also reduced. This results from the fact that by the double setting as described above, the engaging recesses 11 and the engaging portion of the strut engaging surfaces 13 a are plural in number (3 in case of the above setting) so that loads, when locked, applied to the notch engaging surface 11a and the strut engaging surface 13 are distributed to substantially reduce the load applied to one part, whereby the strength of the notch engaging surface 11a and the strut engaging surface 13 can be increased. In case of one-part engagement, since the force for pressing the strut 9 against the side of the pocket portion 8 is generated in terms of balance of forces when locked, there is the possibility that damage such as cracks occurs from the side of the pocket portion 8 in contact with the strut 9. However, by the provision of simultaneous engagement at a plurality of parts (equally provided) as described above, the force can be balanced merely by the strut engaging surface 13, the contact between the strut 9 and the side of the pocket portion 8 can be removed, and there is also an effect of increasing strength.

Further, since the reinforcing fittings 15 is arranged within the pocket portion 8, and particularly, the strut engaging surface 13 is formed by one surface of the reinforcing fittings 15, it is possible to repeat of moving close to and away from the metal strut 9 and reinforce the strut engaging surface 13 subjecting to a great load when locked of the clutch 5 by the reinforcing fittings 15. Accordingly, thereby, the strength of the strut engaging surface 13 can be increased.

Embodiment 4

Figure 10:
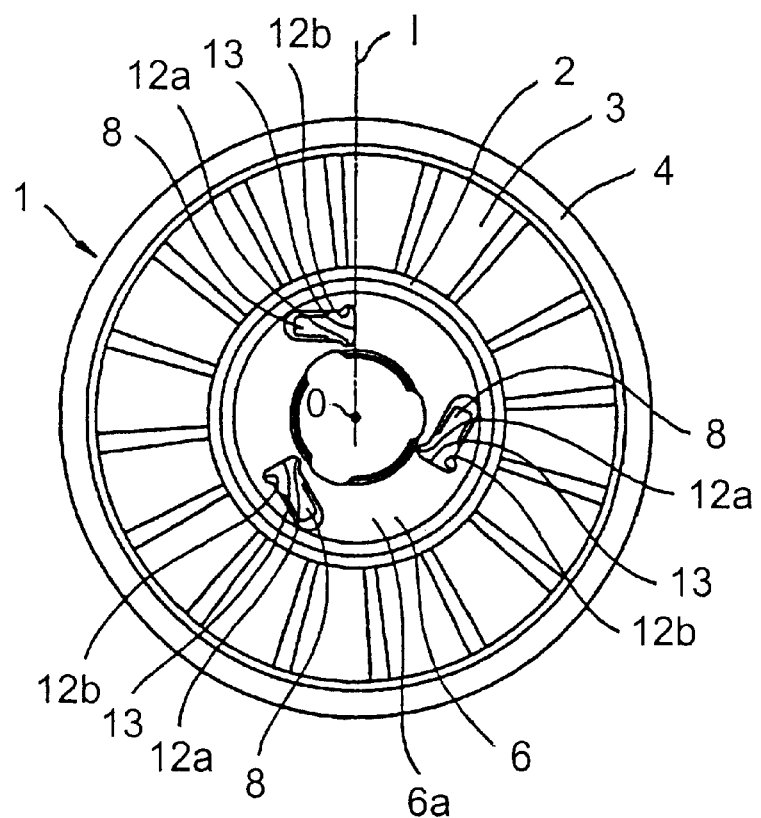
FIG. 10 is a front view of a stator body provided on a stator according to a fourth embodiment of the present invention.
Figure 12:
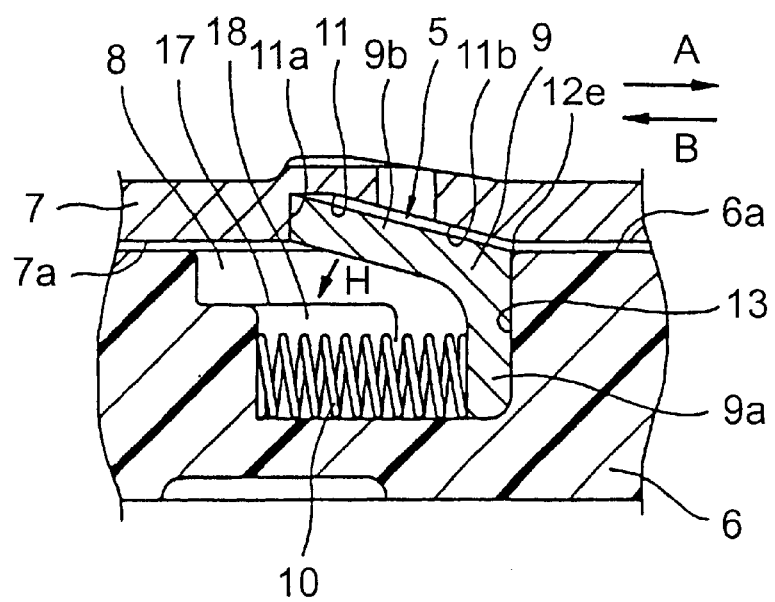
FIG. 12 is an enlarged sectional view of main parts showing an assembled state of the stator.
Figure 11A:
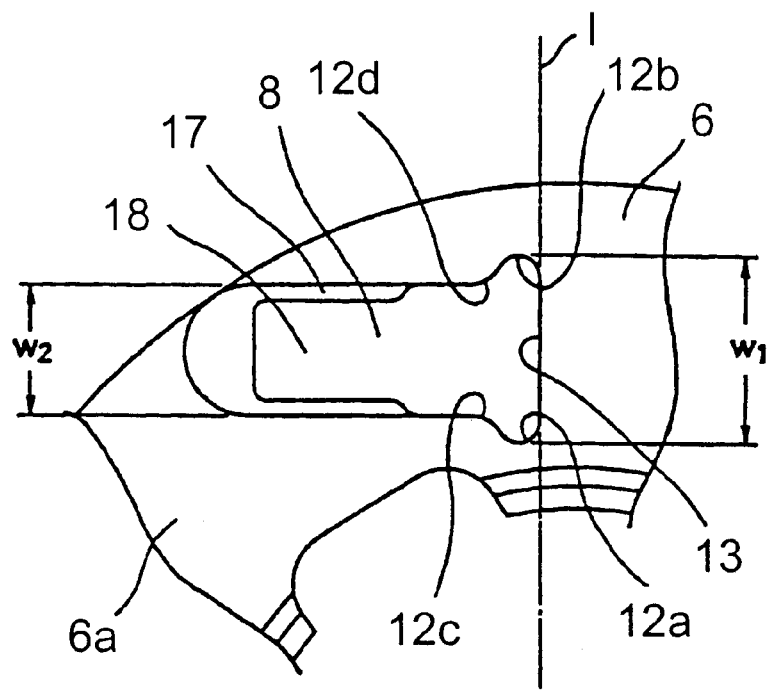
FIG. 11(A) is an enlarged view of main parts of FIG. 10, and FIG. 11(B) being a sectional view thereof.
Figure 11B:
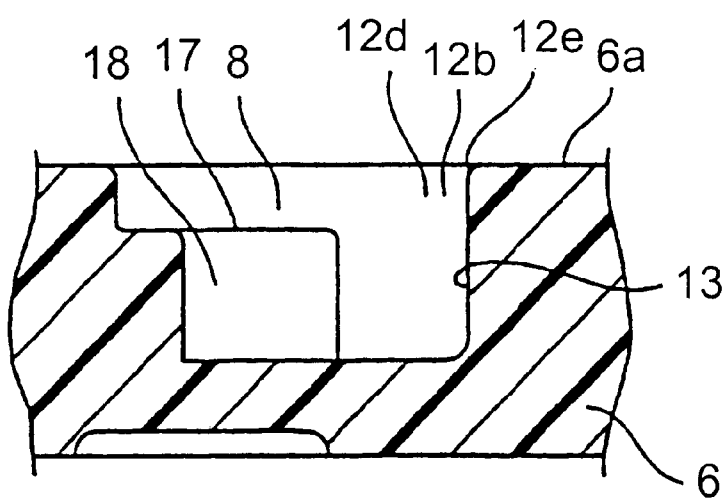

Note that the above-described reinforcing fittings 15 may be omitted, as shown in FIGS. 10 to 12, in which case, the strut engaging surface 13 is formed of resin such as phenol resin which is a molding material for the stator body 1 and the pocket plate 6. Where the strut engaging surface 13 and the pocket portion 8 are molded of resin as described, there sometimes appears a phenomenon that the strut engaging surface 13 peels off in a racking test (a test for applying torsional torque till being broken in a locking direction) and a repeated torsional test (a test for repetitively applying torsional torque of certain fixed torque in a locking direction). To prevent this, it is desired that in case of a single resin, an R 12e for prevention of peeling off be attached to an end corner (an upper side corner) of the strut engaging surface 13. Suitably, the size of the R 12e is approximately 0.2 to 1.0 mm of radius in actual dimension. Other constitutions, operation and effect in Embodiment 4 are the same as those of the above-described Embodiment 3.

Embodiment 5

In the above-described Embodiment 3, since the spring 10 is arranged in the horizontal direction in the figure, as shown in FIG. 6, when the stator is assembled, the procedure of mounting the strut 9 and the spring 10 on the pocket portion 8 comprises first inserting the strut 9 into the pocket portion 8, and then compressing and inserting the spring 10 while raising the strut 9, thus posing a little inconvenience.

Figure 13A:
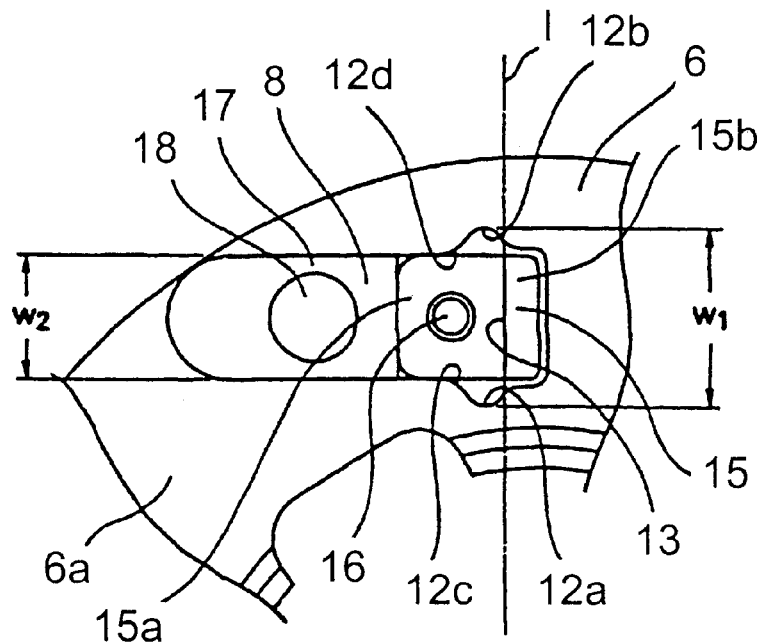
FIG. 13(A) is a front view of main parts of a stator body provided on a stator according to a fifth embodiment of the present invention, and FIG. 13(B) being a sectional view thereof.
Figure 13B:
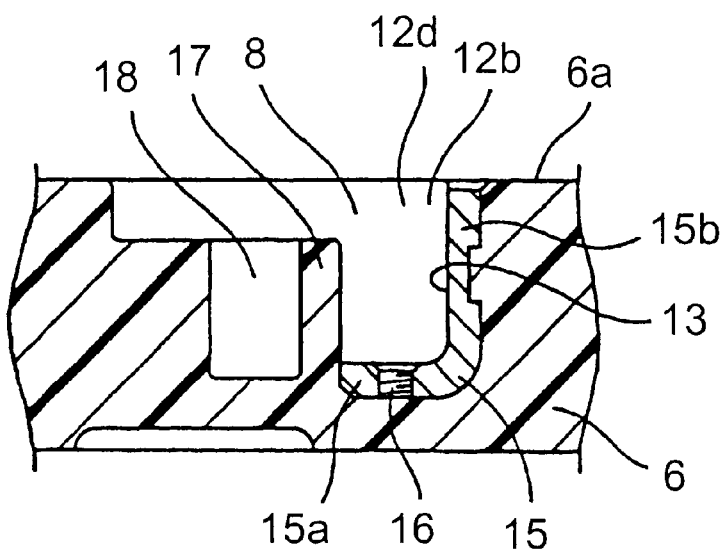
Figure 14:
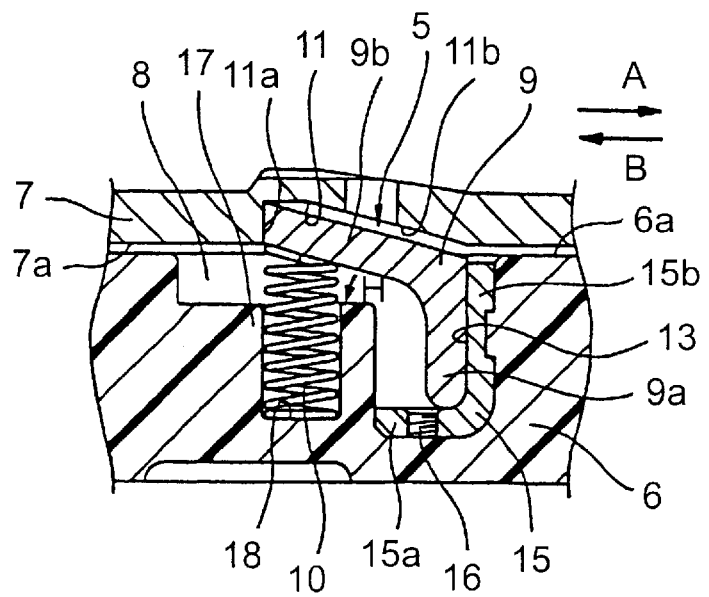
FIG. 14 is a sectional view of main parts showing an assembled state of the stator.
Figure 15:
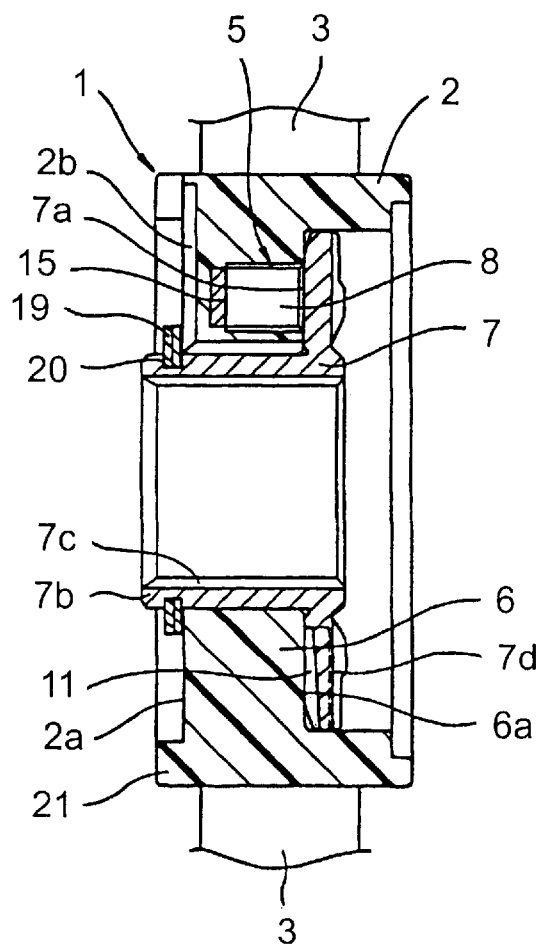
FIG. 15 is a sectional view of main parts showing an assembled state of the stator according to a sixth embodiment of the present invention.

Accordingly, for facilitating the assembly work, it is suitable that the spring 10 is placed longitudinally as shown in FIGS. 13 and 14. If the spring 10 is placed longitudinally, the spring 10 is inserted into the pocket portion 8, and the strut 9 is then merely placed on the spring 10, thus enabling termination of the mounting work of both parts 9 and 10. In the longitudinal placement, the expansion and contraction direction of the spring 10 is set to the depth direction of the pocket portion 8, that is, the expansion and contraction direction of the spring 10 is directed at the axis direction O of the stator body 1. In order to place the spring 10 longitudinally, a closed-end hole-like spring mounting portion 18 is provided on the stopper portion 17 within the pocket portion 8 so as to open to the upper surface thereof, and the spring 10 mounted on the spring mounting portion 18 shaped as described above biases elastically engaging portion 9b of the strut 9 upward in the figure. Accordingly, if the hole-like spring mounting portion 18 is provided so that the spring 10 is inserted into the hole-like spring mounting portion 18, the spring 10 after inserted is well seated to provide an effect in that the spring 10 is hard to be displaced within the pocket portion 8. Further, since the hole-like spring mounting portion 18 works as a guide relative to the expansion and contraction of the spring 10 at the time of locking and idle running, there is also an effect in that the spring 10 operates stable to extend the life thereof. Other constitutions, operation and effect in Embodiment 5 are the same as those of the above-described Embodiment 3.

Embodiment 6

In the above-described Embodiment 3, since the mounting groove 20 for mounting the snap ring 19 is formed in the inner peripheral surface of the inner tube 2 in the stator body 1, as shown in FIG. 9, when the axial load generated when the one-way clutch 5 is locked exerts on the inner tube 2 through the notch plate 7 and the snap ring 19, a region which is weak in strength possibly appears because the wall thickness of the inner tube 2 is relatively thin.

Accordingly, it is suitable for increasing the strength of the snap ring mounting portion to axially extend the cylindrical base portion 7b of the notch plate 7, provide the annular mounting groove 20 in the outer peripheral surface of the end thereof and mount the snap ring 19 in the mounting groove 20. By doing so, the above-described load exerts on the notch plate 7 made of metal, thus enabling an increase of strength of the snap ring mounting portion and preventing the snap ring mounting portion from being broken due to the above-described load. In this case, as shown in the figure, the snap ring 19 is arranged on the side opposite to the pocket plate 6 as viewed from the rising portion 7d of the notch plate 7, and the pocket plate 6 is arranged between the rising portion 7d and the snap ring 19. Further, in the Embodiment 3 (FIG. 9), the dam-like guide portion 21 relative to a needle bearing (not shown) provided on the inner peripheral portion of the other end 2a of the inner tube 2 is shifted to the outer peripheral portion of the other end 2a thereof because a new snap ring 19 comes in engagement with the inner peripheral portion thereof.

Furthermore, where as the snap ring 19, a spiral snap ring (the peripheral length of the snap ring 19 is length longer than circumferential one rotation, thus setting a superposed portion) is used, when the snap ring 19 mounted in the mounting groove 20 of the notch plate 9 to follow the notch plate 9 and the inner tube 2 are rotated relatively, the peripheral end of the snap ring 19 need be prevented for being caught by the side wall of the oil groove 2b radially provided on the other end 2a of the inner tube 2, which will be effective to cope with in the following.

Figure 16A:
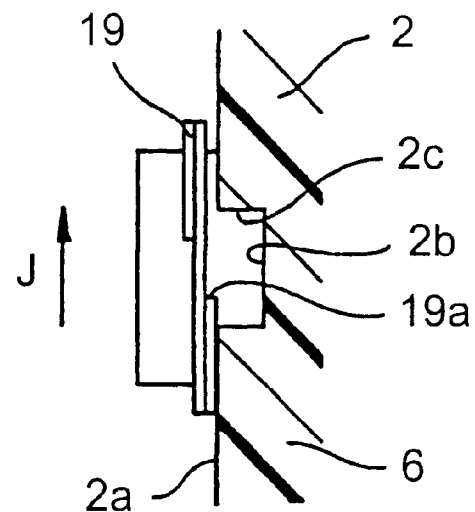
FIG. 16(A) is an explanatory view of arrangement of a snap ring according to a comparative example, and FIG. 16(B) being an explanatory view of arrangement of a snap ring according to the embodiment.
Figure 16B:
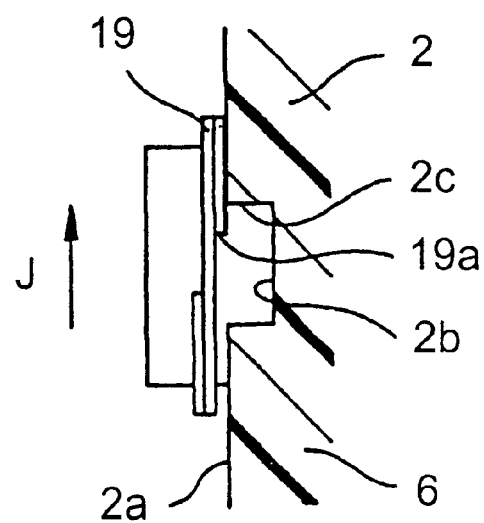
Figure 17:
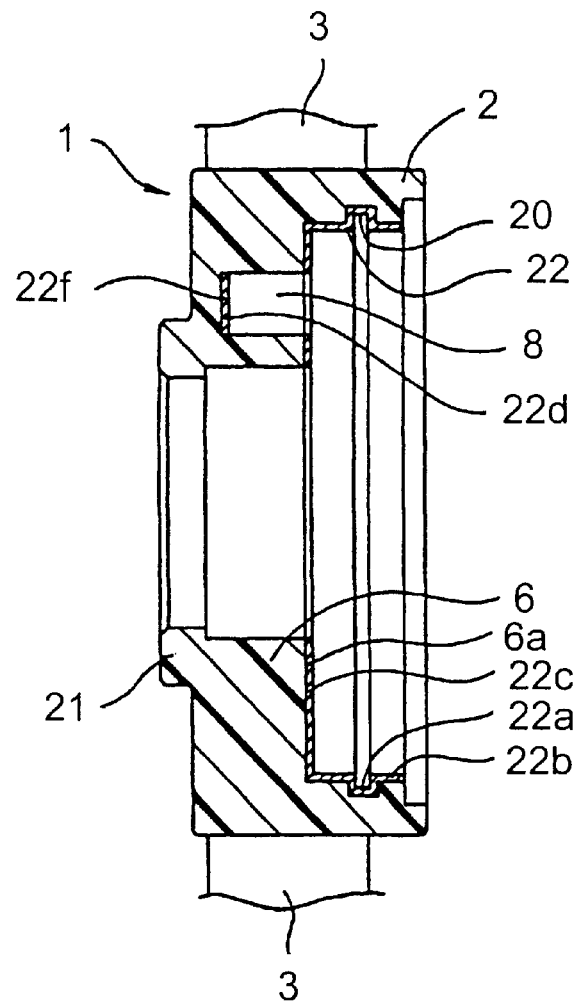
FIG. 17 shows main parts of a stator body provided on a stator according to a seventh embodiment of the present invention.

That is, according to a comparative example shown in FIG. 16(A), when a peripheral end 19a on the inner tube 2 side of the snap ring 19 is arranged in a relatively rotating direction in a whirl in the same direction with respect to a relatively rotating direction (Arrow J) of the snap ring 19 relative to the inner tube 2, the peripheral end 19a is possibly caught by one side wall 2c of the oil groove 2b during the relative rotation. On the other hand, as shown FIG. 16(B), when the peripheral end 19a on the inner tube 2 side of the snap ring 19 is arranged in a direction opposite to the relatively rotating direction in a whirl in the opposite direction with respect to the relatively rotating direction (Arrow J) of the snap ring 19 relative to the inner tube 2, the peripheral end 19a is possible to pass through the side wall 2c without fail along the other end 2a of the inner tube 2 during the relative rotation. Accordingly, by arranging the relatively rotating direction and the volute direction of the snap ring 19 as described above, the end 19a of the snap ring 19 is caught by the oil groove 2b to prevent the relative rotation from being impaired. FIG. 16 depicts an external appearance of the snap ring 19.

Other constitutions, operation and effect in Embodiment 6 are the same as those of the above-described Embodiment 3.

Embodiment 7

Alternatively, in place of the arrangement according to Embodiment 6, a surface reinforcing substance 22 formed of a rigid material such as metal is provided on the inner surface of the mounting groove 20 formed in the inner peripheral surface of the inner tube 2 to thereby reinforce the inner tube 2. By doing so, strength of the snap ring mounting portion can be increased without changing the arrangement of the mounting groove 20.

Figure 18:
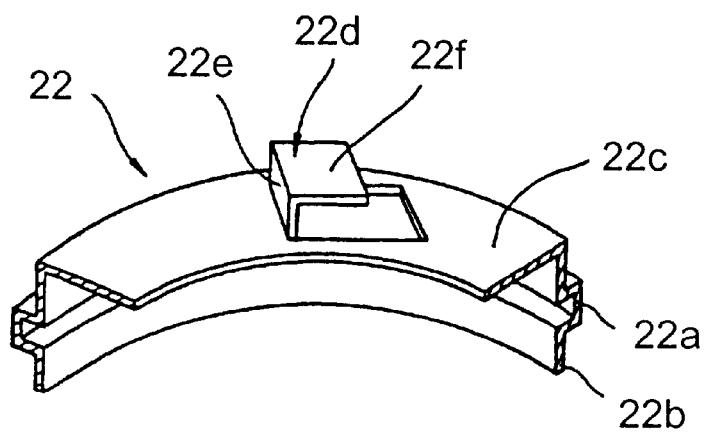
FIG. 18 is a partial perspective view of a surface reinforcing material.
Figure 19:
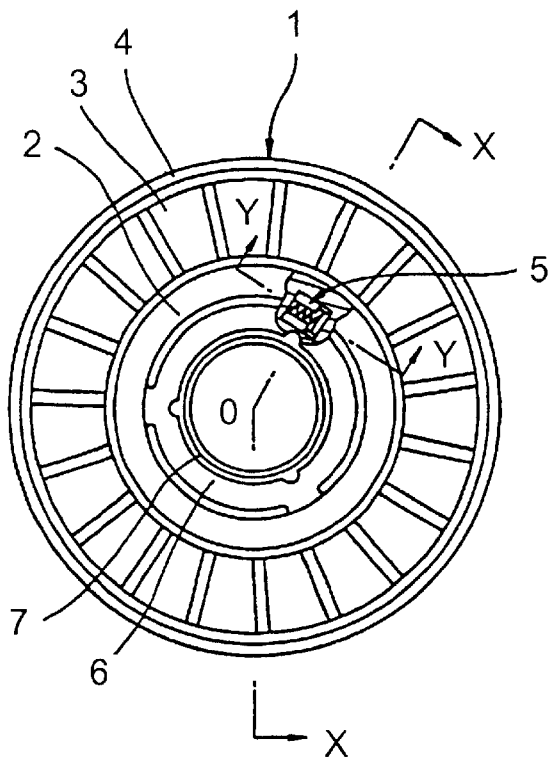
FIG. 19 is a partly cutaway front view of a conventional stator.
Figure 20:
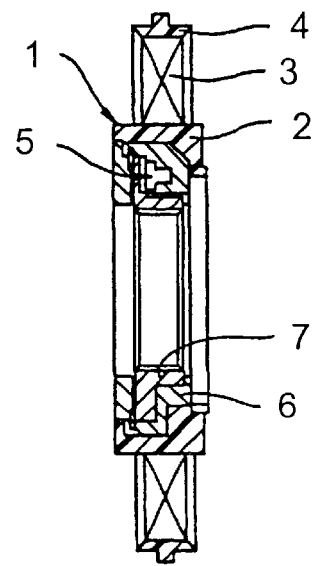
FIG. 20 is a sectional view taken on line X-O-X in FIG. 19.
Figure 21:
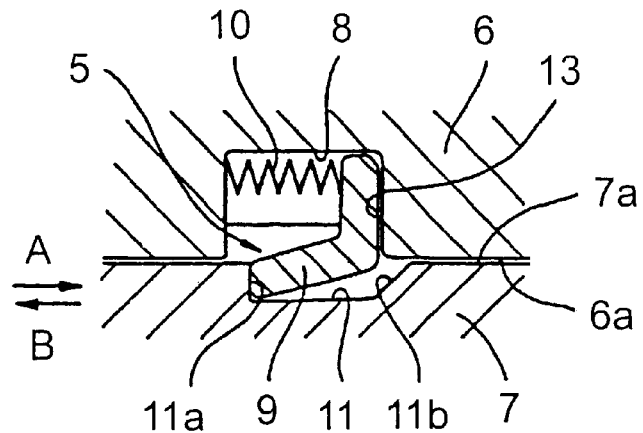
FIG. 21 is an enlarged sectional view taken on line X-Y in FIG. 19.
Figure 22:
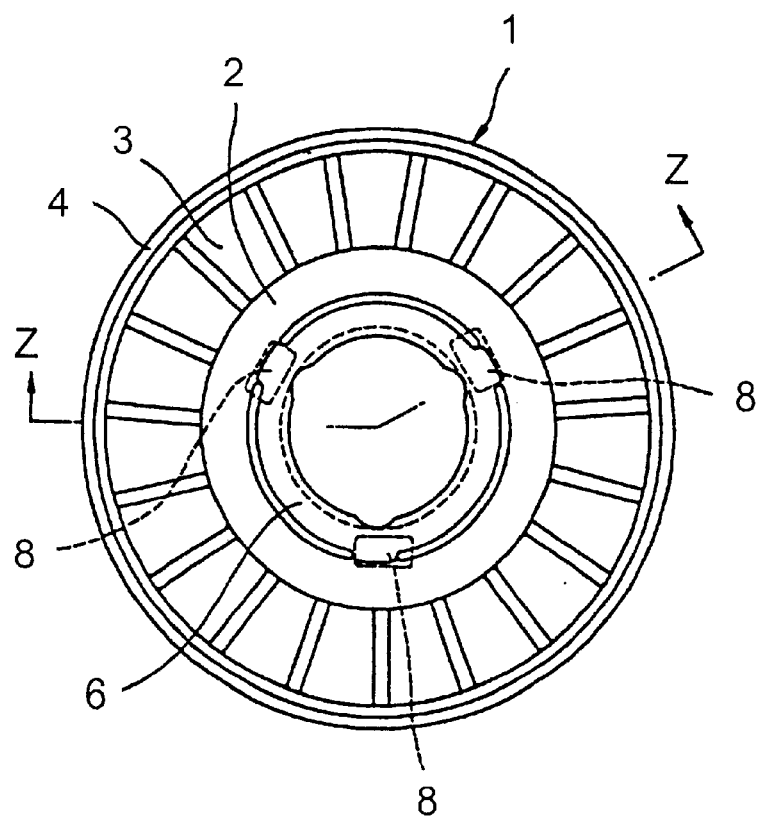
FIG. 22 is a front view of a stator body provided on the other conventional stator.
Figure 23:
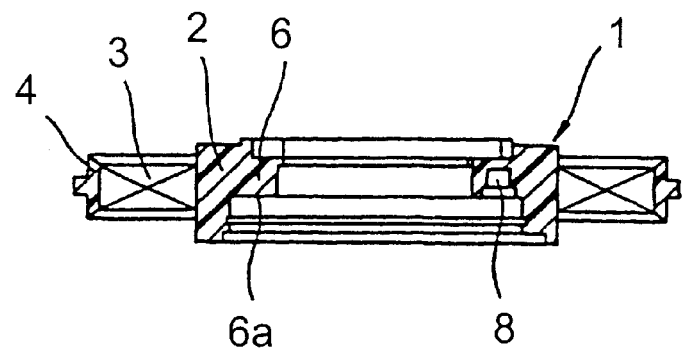
FIG. 23 is a sectional view taken on line Z-O-Z in FIG. 22.

The surface reinforcing substance 22 is provided with an annular mounting groove reinforcing portion 22a in the shape of ⊐ in section for covering the inner surface of the mounting groove 20, the mounting-groove reinforcing portion 22a being secured to the inner peripheral surface of the inner tube 2 by insert molding or the like. The surface reinforcing substance 22 shown is integrally provided, other than the mounting-groove reinforcing portion 22a, with an inner peripheral surface reinforcing portion 22b for covering the inner peripheral surface of the inner tube 2 and an end reinforcing portion 22c for covering the end portion 6a of the pocket plate further integrally provided with a pocket portion-inner surface reinforcing portion 22d in place of the reinforcing fittings 15 in the Embodiment 3, by which the inner peripheral surface of the inner tube 2, the end portion 6a of the pocket plate 6, and the inner surface of the pocket portion 8 are reinforced. The pocket portion-inner surface reinforcing portion 22d forms a rising portion 22e and a bottom portion 22f similar to the reinforcing fittings 15 by rising a part of the end reinforcing portion 22c in a tongue-like form and bending the end there of at right angles, as shown in FIG. 18, which is easily fabricated by press processing of plate. If the mounting groove 20 is formed in the inner peripheral surface of the inner tube 2 by subjecting the surface reinforcing substance 22 to insert molding as described above, it is not necessary to form the mounting groove 20 by post-processing after the inner tube 2 or the stator body 1 has been molded to omit the step of post-processing for forming the mounting groove 20. Other constitutions, operation and effect in Embodiment 7 are the same as those of the above-described Embodiment 3.

SPECIFIC EXAMPLE OF RADIUS OF R PORTION

In the embodiment shown in FIG. 2, the radius $R_1$ of the R portion 12a is approximately 0.5 to 2.0 mm, and the radius $R_2$ of the R portion 12b is approximately 0.5 to 3.0 mm. The ratio of $R_1/R_2$ is less than 1.

In the Embodiments shown in FIGS. 5, 11 and 13, the radius $R_1$ of the R portion 12a is approximately 0.5 to 2.0 mm, and the radius $R_2$ of the R portion 12b is approximately 0.5 to 3.0 mm. The relation therebetween is $W_1-W_2 > 2R_1$.

FEM ANALYSIS MODELS

Figure 26:
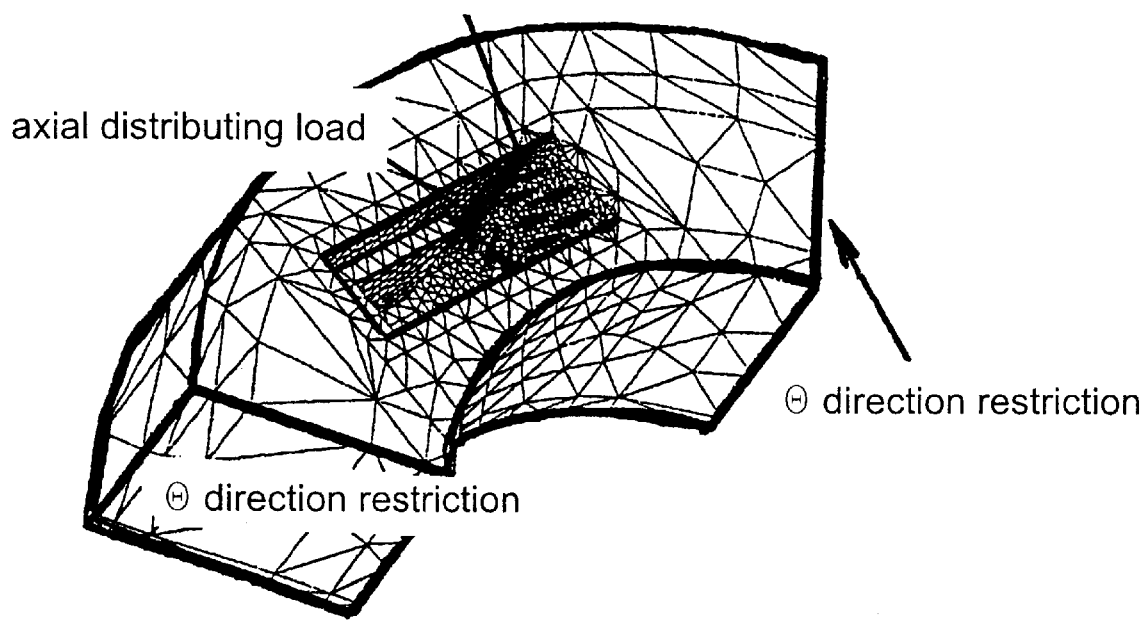
FIG. 26 shows one example of a FEM analysis model of the pocket portion.

FIG. 26 shows one example of the FEM analysis model of the pocket portion.

Figure 27:
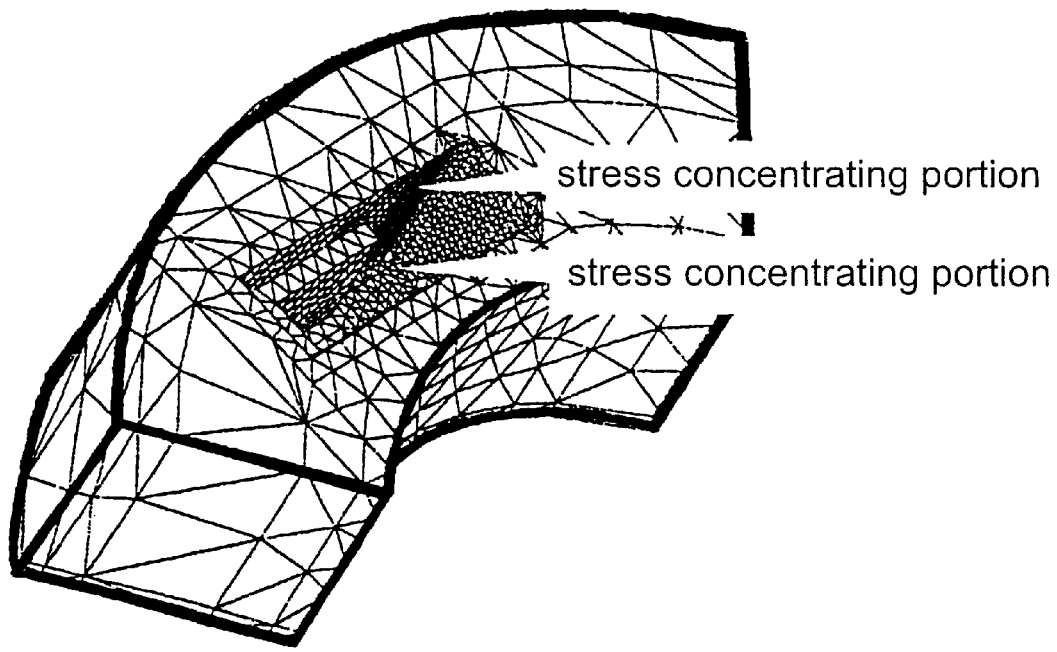
FIG. 27 shows another example of the FEM analysis model of the pocket portion.

FIG. 27 shows the other example of the FEM analysis model of the pocket portion.

Figure 28:
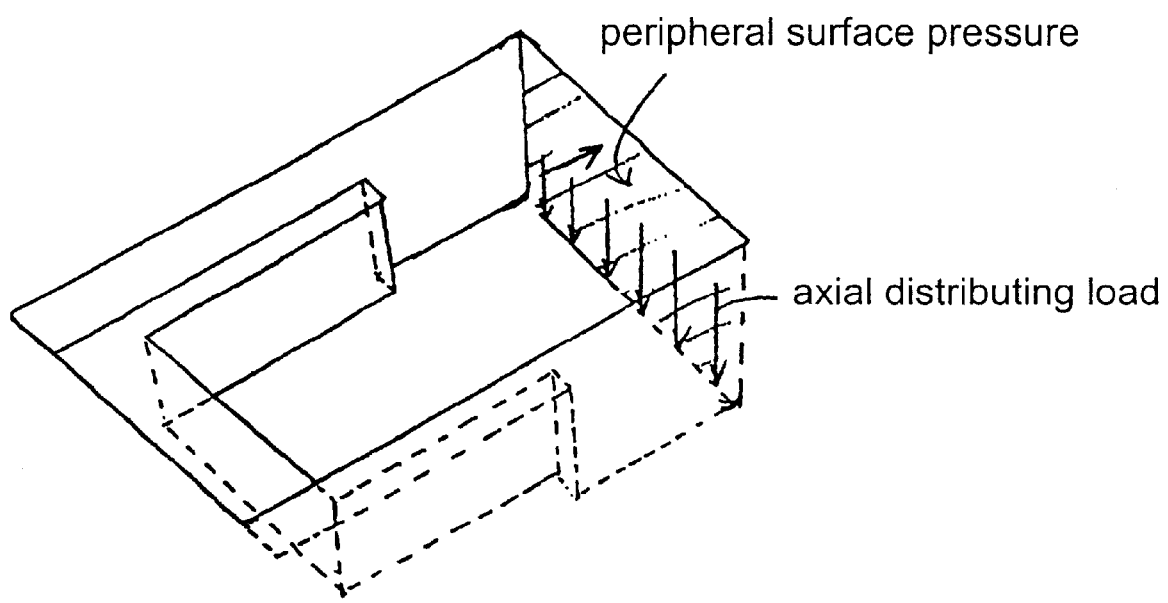
FIG. 28 is an explanatory view showing the surface pressure and the distributed load of the above-mentioned FEM analysis model of the pocket portion.

FIG. 28 is an explanatory view showing the surface pressure and the distributed load of the above-mentioned FEM analysis model of the pocket portion.

It has been found as a result of these analyses that the outer corner R portion is higher in stress than the inner corner R portion. For example, 1.5 to 2 times. Therefore, preferably, the outer corner R portion is set to be larger.

What is claimed is:

1. A stator comprising:

a pocket portion encasing a strut of a one-way clutch is provided in a stator body made of resin, and inner and outer corners R are provided on both inner and outer sides of a strut engaging surface in said pocket portion, the outer corner R being formed to be larger than the inner corner R.

2. The stator according to claim 1, wherein said pocket portion has a stopper portion.

3. The stator according to claim 1, wherein said strut is received in said pocket portion.

4. The stator according to claim 3, wherein said strut is pressed by a spring.

5. The stator according to claim 1, wherein a notch plate has an engaging recess for engaging said strut.

6. The stator according to claim 1, wherein a snap ring is mounted in a groove formed in an inner tube in said stator body.

7. The stator according to claim 6, wherein a surface reinforcing substance is provided on an inner surface of said groove thereby to reinforce said inner tube.

8. A stator comprising:

a pocket portion encasing a strut of a one-way clutch is provided in a stator body made of resin, and inner and outer corners R are provided on both inner and outer sides of a strut engaging surface in said pocket portion, said pocket portion being formed to be inclined at a fixed angle ($\theta_1$) in a tangential direction (D) so that stress generated in the inner corner R is equal to or substantially equal to that generated in the outer corner R.

9. The stator according to claim 8, wherein a notch plate has an engaging recess for engaging said strut.

10. The stator according to claim 8, wherein a snap ring is mounted in a groove formed in an inner tube in said stator body.

11. The stator according to claim 10, wherein a surface reinforcing substance is provided on an inner surface of said groove thereby to reinforce said inner tube.

12. A stator comprising:

an annular pocket plate and a plurality of pocket portions positioned on the pocket plate wherein each of the pocket portions encasing a strut of a one-way clutch is provided in a stator body made of resin, and inner and outer corners R are provided on both inner and outer sides of a strut engaging surface in said pocket portion, said strut engaging surface being arranged on a plane (I) including a center axis (O) of said stator body, and said strut having one end supported by an end of said pocket portion wherein the outer corner is formed to be larger than the inner corner.

13. The stator according to claim 12, wherein width ($W_1$) of the strut engaging surface is formed to be larger than width ($W_2$) of other parts of the pocket portion, and inner and outer corners R are provided on both inner and outer sides of said strut engaging surface.

14. The stator according to claim 13, wherein said pocket portion has a stopper portion.

15. The stator according to claim 13, wherein a reinforcing means reinforces said strut.

16. The stator according to claim 13, wherein said strut is received in said pocket portion.

17. The stator according to claim 13, wherein said strut has a base portion pressed by a spring.

18. The stator according to claim 13, wherein said pocket portion has a pair of stopper portions between which a spring mounting portion is formed.

19. The stator according to claim 13, wherein said strut engaging surface includes a round corner.

20. The stator according to claim 19, wherein a reinforcing means reinforces said strut.

21. The stator according to claim 13, wherein said pocket portion has a hole-like spring mounting portion for mounting a spring.

22. The stator according to claim 21, wherein said strut is placed on one end of said spring, and the other end of said spring is inserted into said hole-like spring mounting portion.

23. The stator according to claim 12, wherein a notch plate has an engaging recess for engaging said strut.

24. The stator according to claim 12, wherein a snap ring is mounted in a groove formed in an inner tube in said stator body.

25. The stator according to claim 24, wherein a surface reinforcing substance is provided on an inner surface of said groove thereby to reinforce said inner tube.

26. A stator comprising:

a pocket portion encasing a strut of a one-way clutch is provided in a stator body made of resin, and inner and outer corners R are provided on both inner and outer sides of a strut engaging surface in said pocket portion, said strut engaging surface being arranged on a plane (I) including a center axis (O) of said stator body, and said strut having one end supported by an end of said pocket portion, width ($W_1$) of the strut engaging surface is formed to be larger than width ($W_2$) of other parts of the pocket portion, and inner and outer corners R are provided on both inner and outer sides of said strut engaging surface, said strut engaging surface includes a round corner, and said round corner has a radius of about 0.2 to 1.0 mm.

* * * * *